United States Patent
Pu et al.

(10) Patent No.: US 11,056,783 B2
(45) Date of Patent: Jul. 6, 2021

(54) COMMUNICATION DEVICE AND COMMUNICATION METHOD

(71) Applicant: HTC Corporation, Taoyuan (TW)

(72) Inventors: Ta-Chun Pu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 43 days.

(21) Appl. No.: 16/133,681

(22) Filed: Sep. 17, 2018

(65) Prior Publication Data

US 2020/0091601 A1    Mar. 19, 2020

(51) Int. Cl.
*H01Q 1/27* (2006.01)
*H01Q 3/24* (2006.01)
*H01Q 21/00* (2006.01)

(52) U.S. Cl.
CPC ............ *H01Q 3/247* (2013.01); *H01Q 1/276* (2013.01); *H01Q 21/0012* (2013.01)

(58) Field of Classification Search
CPC .... H01Q 1/273; H01Q 1/276; H01Q 21/0012; H01Q 21/29
See application file for complete search history.

(56) References Cited

U.S. PATENT DOCUMENTS

| 2005/0052262 | A1* | 3/2005 | Fukunaga | H01P 1/20345 333/204 |
| 2014/0187179 | A1* | 7/2014 | Ferguson | H01Q 3/24 455/77 |
| 2016/0005233 | A1 | 1/2016 | Fraccaroli et al. | |
| 2018/0062248 | A1* | 3/2018 | Psychoudakis | H01Q 1/273 |
| 2018/0093177 | A1 | 4/2018 | Tokubo | |
| 2018/0259778 | A1* | 9/2018 | Pu | H01Q 21/30 |
| 2019/0214709 | A1* | 7/2019 | Frishman | G02B 27/017 |

FOREIGN PATENT DOCUMENTS

| CN | 102195135 A | 9/2011 |
| CN | 108535887 A | 9/2018 |
| CN | 109075810 A | 12/2018 |
| CN | 109326864 A | 2/2019 |
| WO | 2015014285 A1 | 2/2015 |
| WO | 2018035209 A1 | 2/2018 |

OTHER PUBLICATIONS

Corresponding Taiwan office action dated Dec. 6, 2019.
Corresponding Taiwan office action dated Jul. 21, 2020.
Corresponding Chinese office action dated Sep. 2, 2020.

* cited by examiner

*Primary Examiner* — Daniel Munoz
(74) *Attorney, Agent, or Firm* — CKC & Partners Co., LLC

(57) ABSTRACT

Present disclosure relates to a communication device. The communication device includes a body, a directional antenna array and a radiation structure. The directional antenna array is arranged on a first position of the body. The directional antenna array is configured to transmit a radio frequency signal in a first signal area. The directional antenna array has a non-line-of-sight signal blind area with respect to the body. The radiation structure is arranged on a second position of the body. The directional antenna array is configured to transmit the radio frequency signal guided from the directional antenna array to cover a second signal area. The second position is located in the non-line-of-sight signal blind area of the directional antenna array.

10 Claims, 8 Drawing Sheets

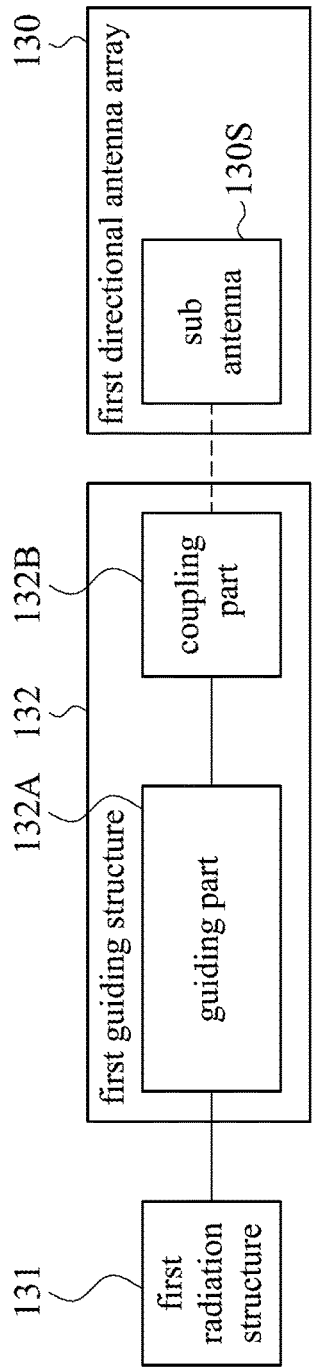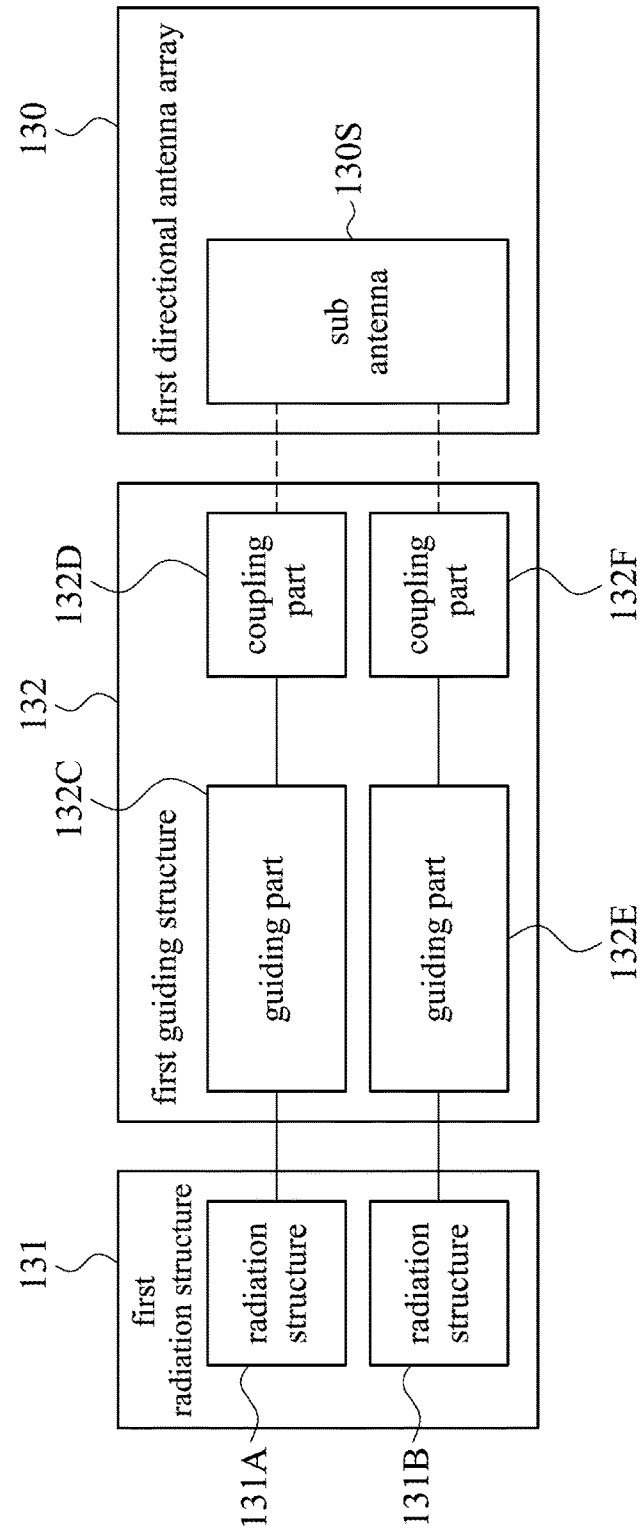

COMMUNICATION DEVICE AND COMMUNICATION METHOD

BACKGROUND

Technical Field

Present disclosure relates to a communication device and a communication method. More particularly, the communication device and the communication method are provided to solve signal shading problems.

Description of Related Art

Simulated environment applications, such as virtual environment and augmented environment, are useful in many fields. Nevertheless, communications of most of simulated environment systems are established via physical cables. To advance such system, the phased array antennas, the grouped phased array antennas or the switch antennas may be mounted on the HMDs (head mounted displays) as wireless communication transmitters. However, such configuration may face a potential problem that the signals from/to the antennas may be shaded by the user's head or the HMDs.

SUMMARY

An aspect of present disclosure provides a communication device. The communication device comprises a body, a directional antenna array and a radiation structure. The directional antenna array is arranged on a first position of the body. The directional antenna array is configured to transmit a radio frequency signal to cover a first signal area. The directional antenna array has a non-line-of-sight signal blind area with respect to the body. The radiation structure is arranged on a second position of the body. The radiation structure is configured to transmit the radio frequency signal guided from the directional antenna array to cover a second signal area. The second position is located in the non-line-of-sight signal blind area of the directional antenna array.

Another aspect of present disclosure is to provide a communication method applied on a communication device. The communication device comprises a body, a directional antenna array and a radiation structure. The radiation structure is coupled to the directional antenna array. The communication method comprises following steps: transmitting, via the directional antenna array being arranged on a first position of the body, a radio frequency signal to cover a first signal area, wherein the directional antenna array has a non-line-of-sight signal blind area with respect to the body; and transmitting, via the radiation structure being arranged on a second position of the body, the radio frequency signal guided from the directional antenna array to cover a second signal area, wherein the second position is located in the non-line-of-sight signal blind area of the directional antenna array.

The approaches above provide the communication device and the communication method. In these approaches, the radiation structure is settled in the non-line-of-sight signal blind area of the directional antenna array so that the radio frequency signals to/from the communication device may be extended to such blind area, which enlarges the signal coverage of the communication device. It stabilizes the signal exchange between the communication device and other communication devices so that disconnections may be possibly avoided.

BRIEF DESCRIPTION OF THE DRAWINGS

Present disclosure may be more fully understood by reading the following detailed description of the embodiment, with reference made to the accompanying drawings as follows:

FIG. 4A is a schematic diagram showing a communication device according to some embodiments of present disclosure.

FIG. 4B is a schematic diagram showing a communication device according to some embodiments of present disclosure.

DETAILED DESCRIPTION

Figure 1:
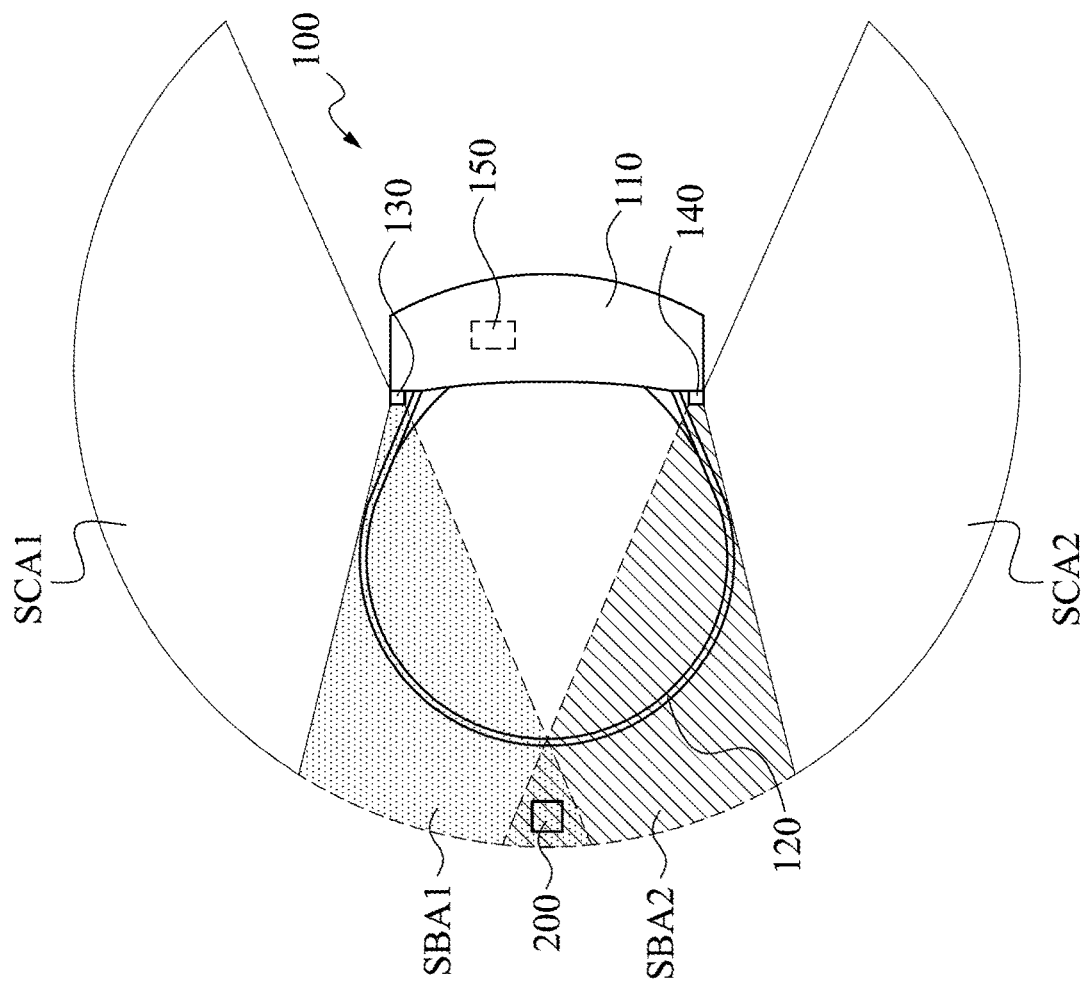
FIG. 1 is a schematic diagram showing a communication device according to some embodiments of present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

It will be understood that, although the terms "first," "second," etc., may be used herein to describe various elements, these elements should not be limited by these terms. These terms are used to distinguish one element from another.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

Furthermore, relative terms, such as "upper" or "top", "lower" or "bottom", "left", "right", "front" or "rear" may be used herein to describe one element's relationship to another element as illustrated in the Figures. It will be understood that relative terms are to describe various elements, and these elements should not be limited by these terms.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram showing a communication device according to some embodiments of present disclosure. As shown in FIG. 1, in one embodiment, an above view of a communication device 100 is provided. As illustrated, the communication device 100 may at least include a head mounted display (HMD) 110 and a wearing structure 120. The head mounted display 110 and the wearing structure 120 may form a body of the communication device 100. The head mounted display 110 may be configured to display an image (and/or provide a sound) to a user of the communication device 100 so that the user may interact (e.g. view images or listen to the sound) with the communication device 100. The user may wear the communication device 100 on his/her head via the wearing structure 120. By doing so, the user may view the images (and/or listen to the sound) that the head mounted display 110 is determined to provide. In some embodiments, the wearing structure 120 may be made by elastic bands, hard plastic materials, soft plastic materials or adjustable belts.

As shown in FIG. 1, in the embodiment, the communication device 100 further includes a first directional antenna array 130 and a second directional antenna array 140. As illustrated, the first directional antenna array 130 is arranged at the left side of the head mounted display 110 (with respect to the facing of the user), and the second directional antenna array 140 is arranged at the right side of the head mounted display 110. In some embodiments, the first directional antenna array 130 and the second directional antenna array 140 may be coupled to a processor 150 of the communication device 100, and the processor 150 may be coupled to the head mounted display 110. The first directional antenna array 130 and the second directional antenna array 140 are configured to exchange signals between the processor 150 and other hosts/communication devices. Except the first directional antenna array 130 and the second directional antenna array 140, the head mounted display 110 may be possibly provided with some other antennas or antenna arrays (not illustrated) at the front as signal exchangers between the processor 150 and other hosts/communication devices.

As shown in FIG. 1, in the embodiment, the first directional antenna array 130 has a first signal covering area SCA1 and the second directional antenna array 140 has a second signal covering area SCA2. In some embodiments, the first directional antenna array 130 can be a millimeter wave antenna array being configured to emit a radio frequency signal. The first directional antenna array 130 may be provided with beamforming structures to emit a beam formed by the radio frequency signal to scan in the first signal covering area SCA1. That is, the first signal covering area SCA1 of the first directional antenna array 130 is an area that the beam formed by the first directional antenna array 130 may cover. Similarly, the second directional antenna array 140 can also be a millimeter wave antenna array. The second signal covering area SCA2 of the second directional antenna array 140 is an area that the beam formed by the second directional antenna array 140 may cover. It is understood that other antennas/antenna arrays being configured at the front of the head mounted display 110 may have corresponding signal covering area as well. In the same manner, a beam formed by the radio frequency signal may scan in such signal covering area.

As shown in FIG. 1, in the embodiment, in the case that the user wears the communication device 100 on his/her head via the wearing structure 120, the user's head (i.e. the area inside the wearing structure 120) and the head mounted display 110 may shade the signal emitted by the first directional antenna array 130 and the second directional antenna array 140. As mentioned, since the first directional antenna array 130 and the second directional antenna array 140 are beam-forming antennas with predetermined directions, in a case that the user's head or the head mounted display 110 are in between of the communication device 100 and another communication device (e.g. a host device), the first directional antenna array 130 or the second directional antenna array 140 are out of line-of-sight to the communication device.

More specifically, due to the shading of the user's head (i.e. the area inside the wearing structure 120), the first directional antenna array 130 has a first signal blind area SBA1 at the rear of the communication device 100. As shown in FIG. 1, the first signal blind area SBA1 are extended from the edges of area covered by the user's head. When the communication device 100 is at this position, an external communication device 200 and/or signals from such external communication device 200 in the first signal blind area SBA1 are non-line-of-sight to the first directional antenna array 130. In the first signal blind area SBA1, the radio frequency signal emitted by the first directional antenna array 130 is weak, therefore the external communication device 200 may not exchange signals with the processor 150 of the communication device 100, via the first directional antenna array 130, effectively.

Similarly, the first directional antenna array 130 has a second signal blind area SBA2 due to such shading. When the external communication device 200 and/or signals from such external communication device 200 are in the second signal blind area SBA2, the external communication device 200 is non-line-of-sight to the second directional antenna array 140 so that the external communication device 200 may not exchange signals with the processor 150 effectively. As shown in the figure, the second signal blind area SBA2 corresponding to the second directional antenna array 140 and the first signal blind area SBA1 corresponding to the first directional antenna array 130 are partially overlapped. It is noted that the shading of the head mounted display 110 may also form some signal blind areas to the first directional antenna array 130 and the second directional antenna array 140 at the front of the head mounted display 110. If the external communication device 200 and/or signals from such external communication device 200 are in such blind areas, the external communication device 200 are out of line-of-sight to the first directional antenna array 130 and the second directional antenna array 140. Therefore, the antennas/antenna arrays disposed at the front of the head mounted display 110 may generate signal beams to remedy such deficiency. In this case, the communication device 100 may still provide a substantial omnidirectional signal coverage.

Figure 2:
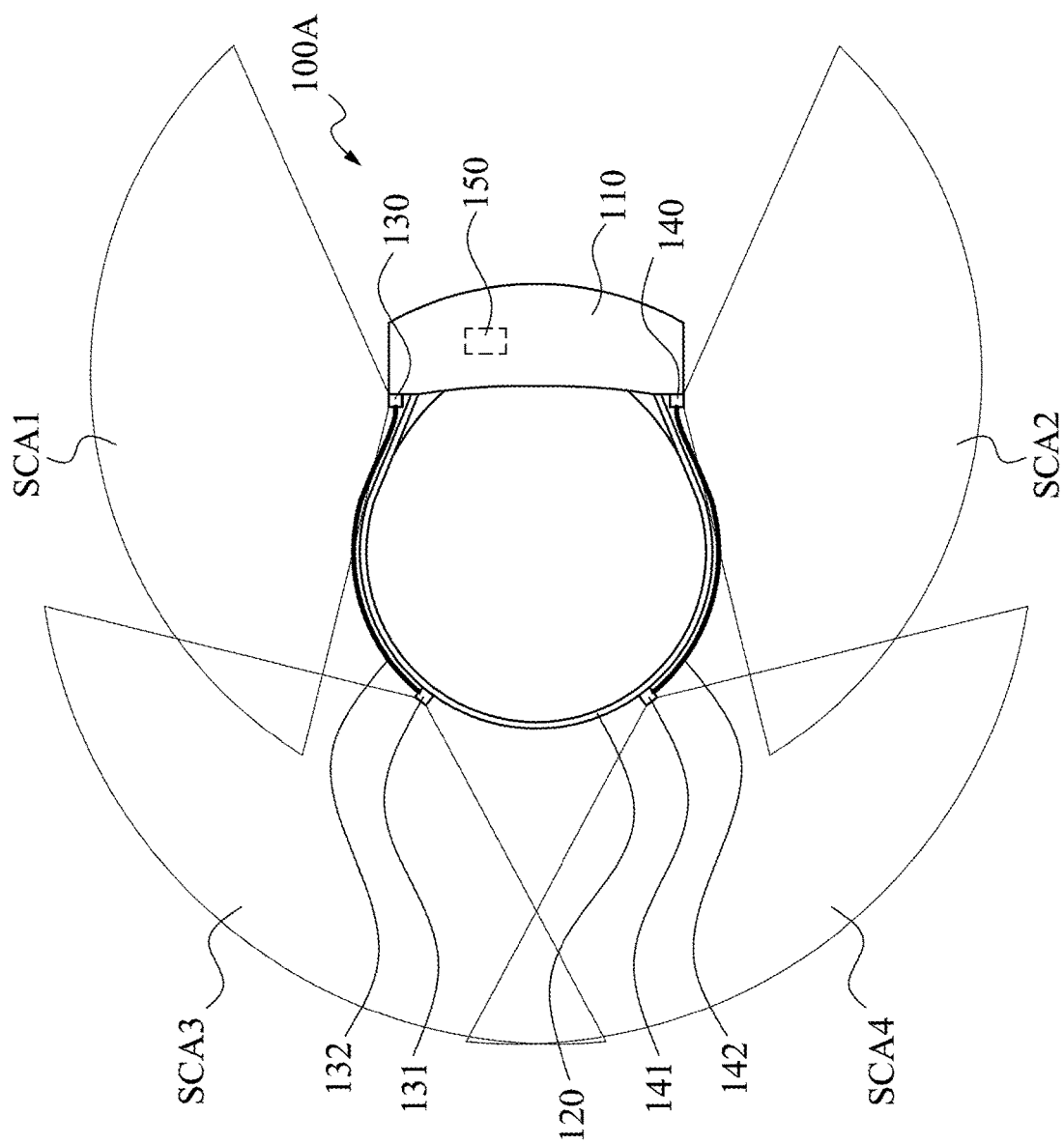
FIG. 2 is a schematic diagram showing a communication device according to some embodiments of present disclosure.
Figure 5B:
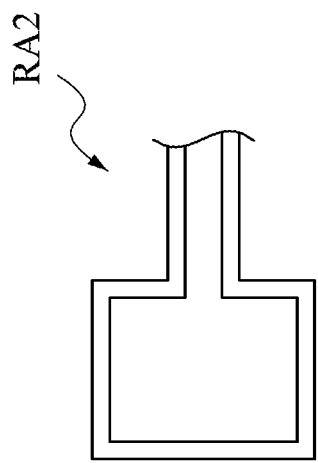
FIG. 5B is a schematic diagram showing parts of a communication device according to some embodiments of present disclosure.
Figure 5C:
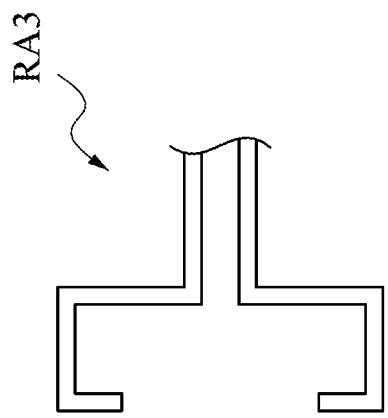
FIG. 5C is a schematic diagram showing parts of a communication device according to some embodiments of present disclosure.
Figure 5A:
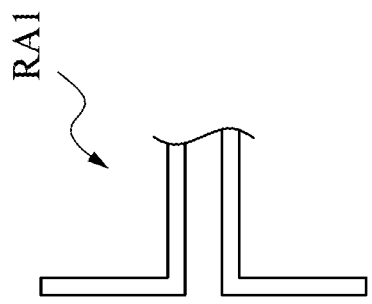
FIG. 5A is a schematic diagram showing parts of a communication device according to some embodiments of present disclosure.
Figure 6A:
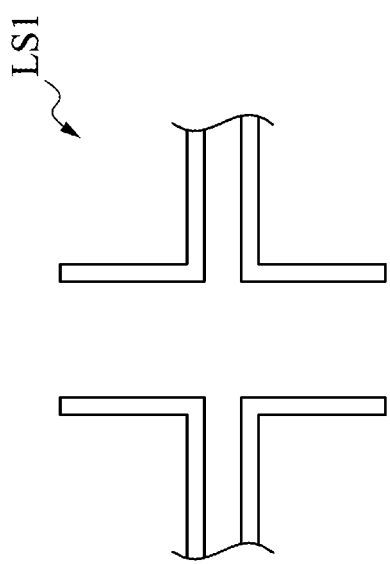
FIG. 6A is a schematic diagram showing a communication device according to some embodiments of present disclosure.
Figure 6B:
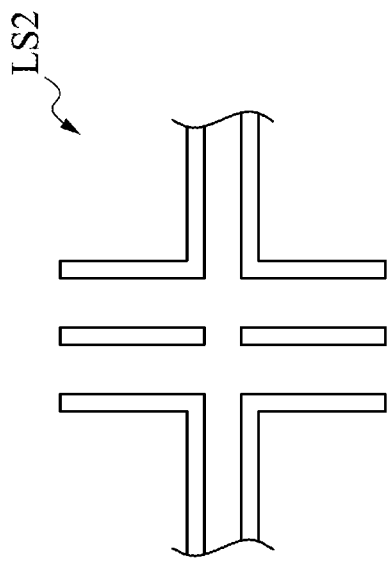
FIG. 6B is a schematic diagram showing a communication device according to some embodiments of present disclosure.
Figure 6C:
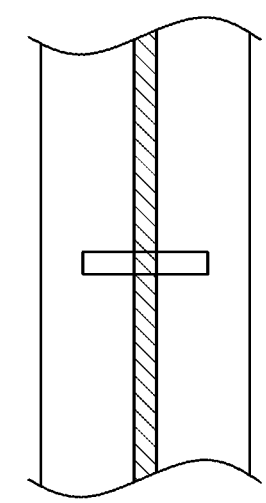
FIG. 6C is a schematic diagram showing a communication device according to some embodiments of present disclosure.
Figure 6D:
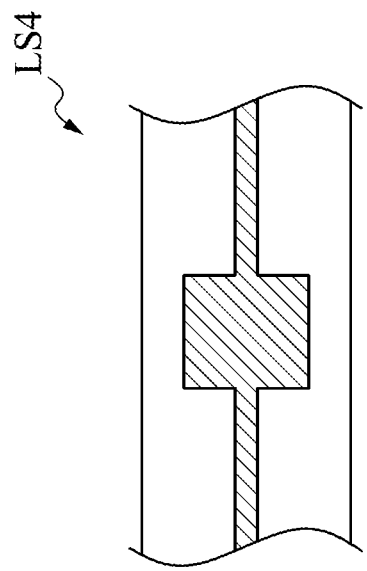
FIG. 6D is a schematic diagram showing a communication device according to some embodiments of present disclosure.

FIG. 2 is a schematic diagram showing a communication device according to some embodiments of present disclosure. In FIG. 2, an above view of a communication device 100A according to one embodiment is shown. It is understood that the configuration of the communication device 100A is substantially the same as the communication device 100 of FIG. 1. The communication device 100A in the embodiment also includes the head mounted display 110, the wearing structure 120, the first directional antenna array 130, the second directional antenna array 140 and the processor 150. The difference is, in the embodiment, the communication device 100A further includes a first radiation structure 131 and a second radiation structure 141. As shown in FIG. 2, the first radiation structure 131 is arranged on the wearing structure 120, substantially positioned to the left-rear of the communication device 100A (with respect to a facing of the user). In this built, the first guiding structure 132 may be a passage that delivers signals between the first radiation structure 131 and the first directional antenna array 130. Similarly, the second radiation structure 141 is arranged on the wearing structure 120, substantially positioned to the right-rear of the communication device 100A (with respect to a facing of the user). In this built, the second guiding structure 142 may be a passage that delivers signals between the second radiation structure 141 and the second directional antenna array 140. In some embodiments, the first radiation structure 131 and the second radiation structure 141 may be made by some passive conductor materials (e.g. as shown in the embodiments of FIG. 5A-5C). In some embodiments, the first radiation structure 131 and the second radiation structure 141 may be implemented by some active circuit elements (e.g. transmitter circuits or amplifier circuits).

In particular, the first guiding structure 132 is arranged at the left side of the wearing structure 120, extending to connect to the first radiation structure 131 at the rear-left. One end of the first guiding structure 132 is arranged in the first signal covering area SCA1 of the first directional antenna array 130. Another end of the first guiding structure 132 is electrically coupled to the first radiation structure 131. In this built, the first guiding structure 132 can be configured to guide the radio frequency signal emitted by the first directional antenna array 130 to the first radiation structure 131 so that the first radiation structure 131 can emit the radio frequency signal to cover a third signal covering area SCA3 at the rear of the wearing structure 120. It is shown that the third signal covering area SCA3 and the first signal covering area SCA1 are partially overlapped.

In correspondence, the second guiding structure 142 is disposed at the right side of the wearing structure 120 and extended to the rear to connect to the second radiation structure 141. An end of the second guiding structure 142 is disposed in the second signal covering area SCA2 of the second directional antenna array 140. Another end of the second guiding structure 142 is electrically coupled to the second radiation structure 141. In such arrangement, the second radiation structure 141 may be used to guide the radio frequency signal generated by the second directional antenna array 140 to the second radiation structure 141 so that the second radiation structure 141 may emit the radio frequency signal to cover a fourth signal covering area SCA4 at the rear of the wearing structure 120. It is shown that the fourth signal covering area SCA4 and the second signal covering area SCA2 are partially overlapped.

Comparing to the embodiment of FIG. 1, the third signal covering area SCA3 shown in FIG. 2 may substantially cover the first signal blind area SBA1 corresponding to the first directional antenna array 130 as shown in FIG. 1, and the fourth signal covering area SCA4 shown in FIG. 2 may substantially cover the second signal blind area SBA2 corresponding to the second directional antenna array 140 as shown in FIG. 1. That is to say, an integration of the first radiation structure 131, the first guiding structure 132, the second radiation structure 141 and the second guiding structure 142 as shown in FIG. 2 may extend a coverage of the radio frequency signals emitted by the first directional antenna array 130 and the second directional antenna array 140 to the rear side of the wearing structure 120. In the case, even if the body of the external communication device 200 or the signal emitted by the external communication device 200 is located at the rear of the wearing structure 120, the external communication device 200 is on line-of-sight to one of the first radiation structure 131 and the second radiation structure 141. Thus, the processor 150 of the communication device 100A is able to exchange signals with the external communication device 200.

It is noted that, in the embodiment of FIG. 2, the positions that the first directional antenna array 130, the first radiation structure 131, the first guiding structure 132, the second directional antenna array 140, the second radiation structure 141 and the second guiding structure 142 being arranged on the communication device 100A are for exemplary purposes but not to limit the scope of present disclosure. These structures may be arranged at other alternative positions of the communication device 100 to adapt different implementations.

Figure 3:
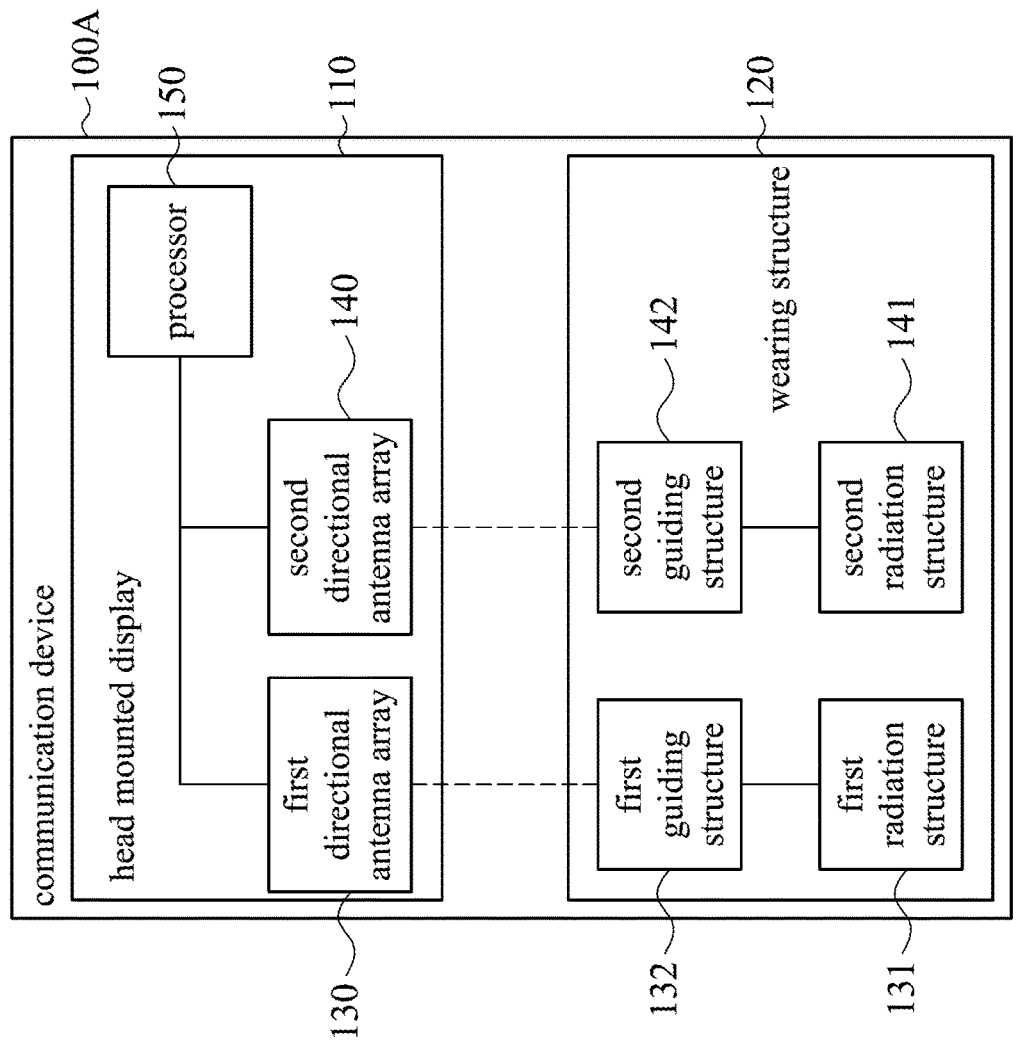
FIG. 3 is a schematic diagram showing a communication device according to some embodiments of present disclosure.

FIG. 3 is a schematic diagram showing a communication device according to some embodiments of present disclosure. FIG. 3 is provided to illustrate the internal components of the communication device 100A of FIG. 2. Therefore, the embodiment of FIG. 2 may be referred for better understandings. As shown in FIG. 3, the communication device 100A includes the head mounted display 110 and the wearing structure 120. The first directional antenna array 130, the second directional antenna array 140 and the processor 150 are arranged on the head mounted display 110. The processor 150 is electrically coupled to the first directional antenna array 130 and the second directional antenna array 140. The first radiation structure 131, the first guiding structure 132, the second radiation structure 141 and the second guiding structure 142 are arranged on the wearing structure 120. The first guiding structure 132 is communicatively coupled to the first directional antenna array 130 and also electrically coupled to the first radiation structure 131. The second guiding structure 142 is communicatively coupled to the second directional antenna array 140 and also electrically coupled to the second radiation structure 141.

FIG. 4A is a schematic diagram showing a communication device according to some embodiments of present disclosure. FIG. 4A is provided to illustrate parts of the internal components of the communication device 100A of FIG. 2-3. Therefore, the embodiments of FIG. 2-3 may be referred for better understandings. In some embodiments, the first guiding structure 132 includes a guiding part 132A and a coupling part 132B. The coupling part 132B is disposed on an end, closed to the first directional antenna array 130, of the first guiding structure 132. The guiding part 132A may be implemented by at least one of a micro strip line structure, a parallel metallic waveguide structure and a substrate integrated waveguide structure. The coupling part 132B may be implemented by at least one of an antenna and a resonator structure. In the embodiment, the first directional antenna array 130 at least includes a sub antenna 130S coupled to the coupling part 132B of the first guiding structure 132. In this way, the radio frequency signal may be delivered to the coupling part 132B via the sub antenna 130S. Another end of the first guiding structure 132 is electrically coupled to the first radiation structure 131. In this way, the radio frequency signal may be delivered to the first radiation structure 131 via the guiding part 132A and be emitted by the first radiation structure 131.

FIG. 4B is a schematic diagram showing a communication device according to some embodiments of present disclosure. FIG. 4B is provided to illustrate parts of the internal components of the communication device 100A of FIG. 2-3. Therefore, the embodiments of FIG. 2-3 may be referred for better understandings. In some embodiments, the first guiding structure 132 includes a guiding part 132C, a coupling part 132D, a guiding part 132E and a coupling part 132F. The first radiation structure 131 includes a radiation part 131A and a radiation part 131B. In the embodiment, one end of the guiding part 132C is coupled to the coupling part 132D and another end of the guiding part 132C is electrically coupled to the radiation part 131A. Correspondingly, one end of the guiding part 132E is coupled to the coupling part 132F and another end of the guiding part 132E is electrically coupled to the radiation part 131B. The first directional antenna array 130 at least includes the sub antenna 130S being coupled to the coupling part 132D and the coupling part 132E.

As shown in FIG. 4B, in the embodiment, the first guiding structure 132 includes two guiding paths. The radio frequency signal may be guided to the radiation part 131A or the radiation part 131B via at least one of the guiding paths. In some embodiments, the radiation part 131A and the radiation part 131B may be arranged at other positions on the wearing structure 120 so that the radiation part 131A and the radiation part 131B may send the radio frequency signal toward different directions, respectively, to cover wider signal areas. It is understood that, the two guiding paths shown in FIG. 4B are for exemplary purposes but no to limit the scope of present disclosure. In some embodiments, the first guiding structure 132 and the first radiation structure 131 may be combined to form more guiding paths.

Figure 4C:
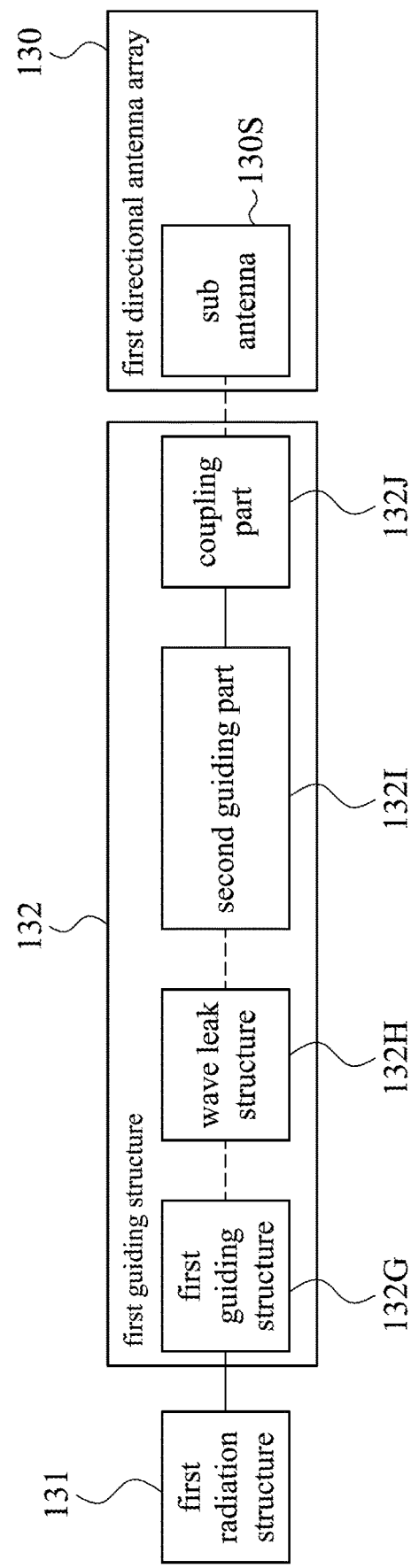
FIG. 4C is a schematic diagram showing a communication device according to some embodiments of present disclosure.

FIG. 4C is a schematic diagram showing a communication device according to some embodiments of present disclosure. FIG. 4C is provided to illustrate parts of the internal components of the communication device 100A of FIG. 2-3. Therefore, the embodiments of FIG. 2-3 may be referred for better understandings. In some embodiments, the first guiding structure 132 includes a first guiding part 132G, a wave leak structure 132H, a second guiding part 132I and a coupling part 132J. The coupling part 132J is arranged on an end of the first guiding structure 132, closed to the first directional antenna array 130. The first guiding part 132G is electrically coupled to the first radiation structure 131. The wave leak structure 132H is arranged between the first guiding part 132G and the second guiding part 132I. The second guiding part 132I is electrically coupled to the coupling part 132J. The first directional antenna array 130 at least includes a sub antenna 130S being coupled to the coupling part 132J.

In the embodiment, the radio frequency signal may be transmitted from the first directional antenna array 130 to the first radiation structure 131 via a path. The path is started from the sub antenna 130S of the first directional antenna array 130 to the coupling part 132J, through the second guiding part 132I, the wave leak structure 132H and the first guiding part 132G to the first radiation structure 131. Then, the radio frequency signal may be emitted by the first radiation structure 131. In some embodiments, the wave leak structure 132H may be implemented by a socket structure, a half wave resonator structure or a quarter wave resonator structure being disposed on a ground plane of the first guiding structure 132. It is noted that, in some embodiments, when the radio frequency signal is passed to the wave leak structure 132H of the first guiding structure 132, the wave leak structure 132H may be configured to leak parts of the radio frequency signal to cover another signal covering area at the lateral side of the communication device 100A. The signal covering area may be partially overlapped to the first signal covering area SCA1 and the third signal covering area SCA3 as shown in FIG. 3. In this manner, the coverage of the radio frequency signal may be wider. The radio frequency signals that are not leaked by the wave leak structure 132H can be delivered to the first radiation structure 131.

It is understood that foregoing embodiments are for exemplary purposes but not to limit the scope of present disclosure. In some embodiments, more wave leak structures can be connected to the first radiation structure 131 so that the communication device 100A may cover a wider area with the radio frequency signal. In some cases, the wave leak structure may be provided at some specific positions on the communication device 100A to cover the areas where weak radio frequency signals are detected.

In the embodiments of FIG. 4A-4C, the first directional antenna array 130, the first radiation structure 131 and the first guiding structure 132 configured at the left side of the communication device 100A are provided as examples. It is understood that, in some embodiments, the second directional antenna array 140, the second radiation structure 141 and the second guiding structure 142 configured at the right side of the communication device 100A may perform same operations as described and the details will not be repeated again.

FIGS. 5A-5C are schematic diagrams showing parts of a communication device according to some embodiments of present disclosure. FIGS. 5A-5C are provided to illustrate parts of the internal components of the communication device 100A of FIG. 2-3. Therefore, the embodiments of FIG. 2-3 may be referred for better understandings. It is noted that, in the embodiments of FIGS. 4A-4C, the communication device 100A may include the coupling part 132B, the first radiation structure 131, the coupling part 132D, the coupling part 132F, the radiation part 131A of the first radiation structure 131 and the radiation part 131B of the first radiation structure 131 and the coupling part 132J. The structures and parts above may be implemented by a radiation structure RA1, a radiation structure RA2 and a radiation structure RA3 shown in FIGS. 5A-5C. As shown in FIGS. 5A-5C, the radiation structures RA1, RA2, RA3 may be one or more radiators/couplers integrated by some conductor segments. In some embodiments, the radiators may be implemented by some wave guide structures.

FIGS. 6A-6D are schematic diagrams showing a communication device according to some embodiments of present disclosure. FIGS. 6A-6D are provided to illustrate parts of the internal components of the communication device 100A of FIG. 2-3. Therefore, the embodiments of FIG. 2-3 may be referred for better understandings. It is noted that, in the embodiments of FIG. 4C, the first guiding structure 132 of the communication device 100A may include the wave leak structure 132H. The wave leak structure 132H can be implemented by a wave leak structure LS1, a wave leak structure LS2, a wave leak structure LS3 and a wave leak structure LS4 shown in FIGS. 6A-6D. As shown in FIGS. 6A-6D, the wave leak structures LS1-LS4 may be constructed by one or more conductor segments. As mentioned, the wave leak structure LS1 may be the wave resonator structure disposed on the ground plane of the guiding structure, the wave leak structure LS2 may be the quarter wave resonator structure disposed on the ground plane of the guiding structure, and the wave leak structure LS3 may be the socket structure disposed on the ground plane of the guiding structure.

The embodiments shown in FIGS. 5A-5C and 6A-6D are just for exemplary purposes. The scope of present disclosure may be implemented by other alternative radiation structures or other alternative wave leak structures that may associated with HMDs.

Figure 7:
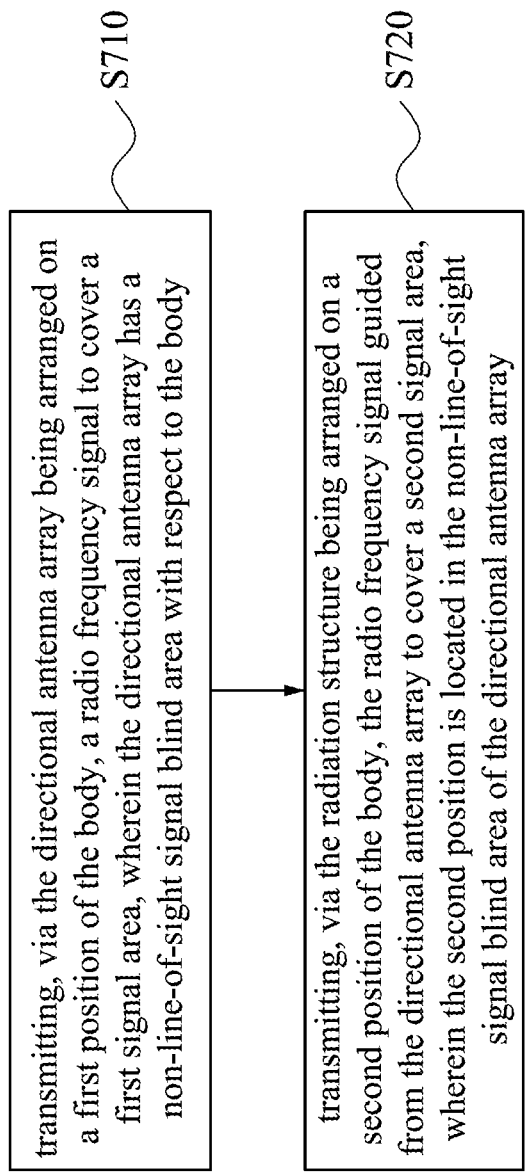
FIG. 7 is a flow chart showing a communication method according to some embodiments of present disclosure.

FIG. 7 is a flow chart showing a communication method according to some embodiments of present disclosure. In the embodiment, a communication method 700 may be executed by the communication device 100A shown in FIG. 2-3. Operations of the components of the communication device 100A can be referred to the embodiments of FIG. 2-3, in view of FIGS. 4A-4C, 5A-5C and 6A-6D. For better understandings, detail steps of the communication method 700 will be described in following paragraphs.

Step S710: transmitting, via the directional antenna array being arranged on a first position of the body, a radio frequency signal to cover a first signal area, wherein the directional antenna array has a non-line-of-sight signal blind area with respect to the body.

As shown in FIG. 1, in some embodiments, the communication device 100 includes the first directional antenna array 130 and the second directional antenna array 140, in which the first directional antenna array 130 has the first signal covering area SCA1 and the second directional antenna array 140 has the second signal covering area SCA2. In some embodiments, since the wearing structure 120 may shade parts of the radio frequency signals emitted by the directional antenna array 130 and the second directional antenna array 140, the first signal blind area SBA1 and the second signal blind area SBA2 are formed at the rear side of the communication device 100.

Step S720: transmitting, via the radiation structure being arranged on a second position of the body, the radio frequency signal guided from the directional antenna array to cover a second signal area, wherein the second position is located in the non-line-of-sight signal blind area of the directional antenna array.

As shown in FIG. 2, in some embodiments, the communication device 100A further includes the first radiation structure 131 and the second radiation structure 141. The first radiation structure 131 is communicatively coupled to the first directional antenna array 130 via the first guiding structure 132 and the second radiation structure 141 is communicatively coupled to the second directional antenna array 140 via the second guiding structure 142. It is noted that the first radiation structure 131 is substantially disposed in the first signal blind area SBA1 of the first directional antenna array 130 the first signal blind area SBA1 and the second radiation structure 141 is substantially disposed in the second signal blind area SBA2 of the second directional antenna array 140.

As shown in FIG. 2, in some embodiments, the first guiding structure 132 may be configured to guide the radio frequency signal emitted by the first directional antenna array 130 to the first radiation structure 131 so that the first radiation structure 131 may emit the radio frequency signal to cover the third signal covering area SCA3. As shown, the third signal covering area SCA3 and the first signal covering area SCA1 are partially overlapped. Similarly, the second guiding structure 142 may be configured to guide the radio frequency signal emitted by the second directional antenna array 140 to the second radiation structure 141 so that the second radiation structure 141 may emit the radio frequency signal to cover the fourth signal covering area SCA4. As shown, the fourth signal covering area SCA4 and the second signal covering area SCA2 are partially overlapped.

As mentioned in foregoing embodiments, the communication method 700 may be used to extend the radio frequency signal to cover the third signal covering area SCA3 and the fourth signal covering area SCA4 as shown in FIG. 2. That is, the first signal blind area SBA1 and the second signal blind area SBA2 shown in FIG. 1 are in coverage of the radio frequency signal according to the implementation. In this case, signal exchanges between the processor 150 of the communication device 100A and the external communication device 200 may be established.

It noted that, in foregoing embodiments, the radio frequency signal is emitted from the communication device 100A. However, the communication device 100A may also receive radio frequency signals sending from the external communication device 200 via the first directional antenna array 130 and the second directional antenna array 140. As shown in FIG. 1, when the external communication device 200 itself or the signals from such device are in the range of the first signal blind area SBA1 and the second signal blind area SBA2, the radio frequency signals sending from the external communication device 200 may be received by the first radiation structure 131 or the second radiation structure 141, and the first guiding structure 132 or the second guiding structure 142 may guide the radio frequency signals to the first directional antenna array 130 or the second directional antenna array 140. In this manner, the processor 150 of the communication device 100A may obtain the radio frequency signals.

According to foregoing embodiments, present disclosure provides a modified approach for connecting the HMDs to the host computer. Information from the communication device 100A may be sent to the host computer via a wireless path instead of a physical cable. The communication device 100A of present disclosure may provide better user experiences by solving a disconnection issue due to blind areas of the radio frequency signal.

Although the present disclosure has been described in considerable detail with reference to certain embodiments thereof, other embodiments are possible. It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication device, comprising:
a body;

a directional antenna array, arranged on a first position of the body, being configured to transmit a radio frequency signal to cover a first signal area, wherein the directional antenna array has a non-line-of-sight signal blind area with respect to the body;

a radiation structure, arranged on a second position of the body, being configured to receive the radio frequency signal delivered from the directional antenna array, and transmit the radio frequency signal to cover a second signal area, wherein the second position is located in the non-line-of-sight signal blind area of the directional antenna array; and a guiding structure, arranged between the first position and the second position of the body, having a first end and a second end, wherein the first end of the guiding structure is communicatively coupled to the directional antenna array in the first signal area and the second end of the guiding structure is communicatively coupled to the radiation structure in the second signal area, and the guiding structure is configured to guide the radio frequency signal from the directional antenna array to the radiation structure;

wherein the guiding structure comprises a coupling part disposed on the first end to receive the radio frequency signal from the directional antenna array;

wherein a wave leak structure is arranged between the first end and the second end of the guiding structure, the wave leak structure is configured to leak part of the radio frequency signal delivered from the directional antenna array to cover a third signal area;

wherein a frequency band of the radio frequency signal passing though the leaked part and transmitted by the radiation structure is the same as a frequency band of the radio frequency signal transmitted by the directional antenna array.

2. The communication device of claim 1, wherein the guiding structure comprises a micro strip line, a parallel metallic waveguide structure or a substrate integrated waveguide structure, and the coupling part is an antenna or a resonator structure.

3. The communication device of claim 1, wherein the wave leak structure comprises a socket structure, a half wave resonator structure or a quarter wave resonator structure, and the socket structure, the half wave resonator structure or the quarter wave resonator structure is disposed on a ground plane of the guiding structure.

4. The communication device of claim 1, wherein the third signal area is partially overlapped with the first signal area.

5. The communication device of claim 1, wherein the first signal area is partially overlapped with the second signal area.

6. The communication device of claim 1, wherein the body comprises a helmet mounted display and the first position is on the helmet mounted display.

7. The communication device of claim 6, wherein the body comprises a wearing structure connected to the helmet mounted display, and the second position is on the wearable structure.

8. A communication method, applied on a communication device that comprises a body, a directional antenna array and a radiation structure, the radiation structure is coupled to the directional antenna array, and the communication method comprising:

transmitting, via the directional antenna array being arranged on a first position of the body, a radio frequency signal to cover a first signal area, wherein the directional antenna array has a non-line-of-sight signal blind area with respect to the body;

delivering the radio frequency signal from the directional antenna array to the radiation structure; and transmitting, via the radiation structure being arranged on a second position of the body, the radio frequency signal delivered from the directional antenna array to cover a second signal area, wherein the second position is located in the non-line-of-sight signal blind area of the directional antenna array, wherein the radio frequency signal is delivered from a guiding structure arranged between the first position and the second position of the body to the radiation structure, the guiding structure has a first end being disposed in the first signal area and a second end being coupled to the radiation structure; and leaking, by a wave leak structure being arranged between the first end and the second end of the guiding structure, part of the radio frequency signal delivered from the directional antenna array to cover a third signal area;

wherein a frequency band of the radio frequency signal passing though the leaked part and transmitted by the radiation structure is the same as a frequency band of the radio frequency signal transmitted by the directional antenna array.

9. The communication method of claim 8, wherein the third signal area is partially overlapped with the first signal area.

10. The communication method of claim 8, wherein the first signal area is partially overlapped with the second signal area.

* * * * *